(No Model.)
H. LÖHERS.
TOOTH BRUSH.
No. 490,831. Patented Jan. 31, 1893.
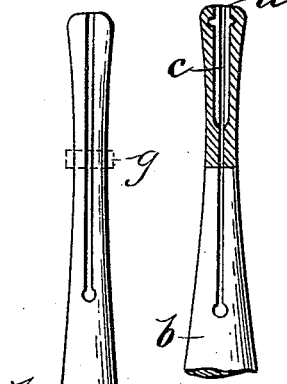
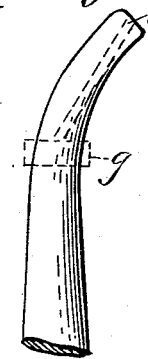
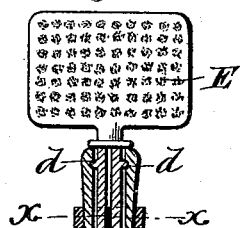
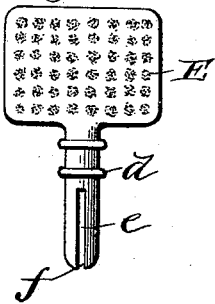
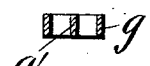
Witnesses
Severance
W. Harvey Muzzy
Inventor
Heinrich Löhers
by W. H. Babcock
Attorney

United States Patent Office.

HEINRICH LÖHERS, OF HEIDELBERG, GERMANY.

TOOTH-BRUSH.

SPECIFICATION forming part of Letters Patent No. 490,831, dated January 31, 1893.

Application filed March 10, 1892. Serial No. 424,463. (No model.)

*To all whom it may concern:*

Be it known that I, HEINRICH LÖHERS, a citizen of the German Empire, residing at Heidelberg, Germany, have invented certain new and useful Improvements in Tooth-Brushes; and I do hereby declare the following to be a full, clear, and exact description of the invention, such as will enable others skilled in the art to which it appertains to make and use the same.

This invention has for its object improvements in that class of tooth brushes that are especially adapted to brush the teeth in the direction of growth and to allow the same handle to be used with new brushes as the old ones are successively used up.

The said invention consists in the construction and combination of devices hereinafter particularly set forth and claimed.

The organs of mastication are subject to a series of pathologic phenomena, the cause of which is found principally in the defective care given them. To take reasonable care of the teeth, it is necessary that they should be brushed on all their faces and that the brush-strokes should be applied in the direction of the growth of the teeth in such manner as to press the gums against the teeth while rubbing them and to remove fragments of food with certainty from between the teeth.

In the accompanying drawings, Figure 1 represents a detail side elevation of my improved brush-handle; Fig. 2 a longitudinal section of the socket end of the same; Fig. 3 a side elevation of the said end; Fig. 4 a detail front elevation of the brush proper; Fig. 5 an end elevation of the same from the direction of the handle; Fig. 6 a detail side elevation of the fastening ring; Fig. 7 a cross-section of the same; Fig. 8 a plan of the same; Fig. 9 a front elevation of the complete brush and handle partly sectioned and broken away at the end; Fig. 10 a cross-section on the line x—x of Fig. 9; and Fig. 11 represents a side elevation of the brush and handle in one of the positions to which the former may be adjusted for use.

The handle b is of rubber steel wood or any suitable material and bent or curved as indicated at its socket end. There a slot a is cut into it bifurcating the said end the said bifurcated end being resilient. A recess or socket c is also formed in this end of the handle to receive a tongue e, of the brush proper E, which tapers slightly. This tongue is also bifurcated by a slot f, allowing some elastic action, and provided with a fixed collar d which fits into a corresponding recess in the walls of the socket.

g designates a fastening ring which is placed around the narrow neck of the brush and which has a central partition g' that passes down between the bifurcations of the said handle and within the slot a and socket c. The bifurcations of tongue e straddle this partition the slot f receiving it. By means of these detachable fastening devices the position of the brush proper may be varied, so as to adapt it to brush all the faces of the teeth in the line of growth of the latter. Thus Fig. 11 shows it in position to clean the inner faces of the upper and lower incisors; but it may be adjusted equally well to any of the other positions suitable to operating most advantageously on any part of any of the teeth.

When the brush is to be shifted from one position to another, the ring g is slipped onto the narrowest part of the neck allowing the elastic parts of the socket and tongue to separate and the brush to be removed turned as desired and replaced. The ring g is then moved to the thicker part of the said neck compressing the socket on the tongue. When the brush is to be temporarily out of use, it is withdrawn from the handle and introduced into a large-necked vessel holding about thirty grams of an antiseptic solution.

Having thus described my invention, what I claim as new and desire to secure by Letters Patent is:

1. A tooth-brush having a detachable handle which is bent for convenience of brushing in the line of growth of the teeth and fastening devices consisting of a ring g provided with a central partition g' for engaging the brush rod and which allows the said brush to be turned on the said handle into various positions substantially as set forth.

2. A tooth-brush handle having a socket and slot in one end, in combination with a brush proper having a bifurcated tongue to enter the said slot, and a fastening collar which surrounds the neck of the brush and has a cross partition fitting in the slot of the handle and straddled by the bifurcated tongue substantially as set forth.

3. A tooth-brush handle having an elastic socket end, in combination with a tooth brush proper having a tongue which enters the said end and a fastening device for holding the said tongue and socket together the said tongue having a ring formed on it which enters a corresponding recess of the said socket substantially as set forth.

In testimony whereof I affix my signature in presence of two witnesses.

HEINRICH LÖHERS.

Witnesses:
EMILE KANTER,
GUILLAUME ANTHONISSEN.